W. B. UPDEGRAFF.
PRESS FOR PLASTIC MATERIALS.
APPLICATION FILED MAR. 28, 1910.

994,349.

Patented June 6, 1911.
6 SHEETS—SHEET 4.

W. B. UPDEGRAFF.
PRESS FOR PLASTIC MATERIALS.
APPLICATION FILED MAR. 28, 1910.

994,349.

Patented June 6, 1911.
6 SHEETS—SHEET 5.

Witnesses:
O. W. Gardner

Inventor:
William B. Updegraff
By his Attorney
Geo. Wm. Miatt

W. B. UPDEGRAFF.
PRESS FOR PLASTIC MATERIALS.
APPLICATION FILED MAR. 28, 1910.
994,349.
Patented June 6, 1911.
6 SHEETS—SHEET 6.
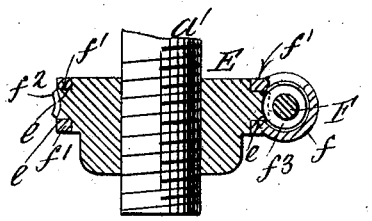
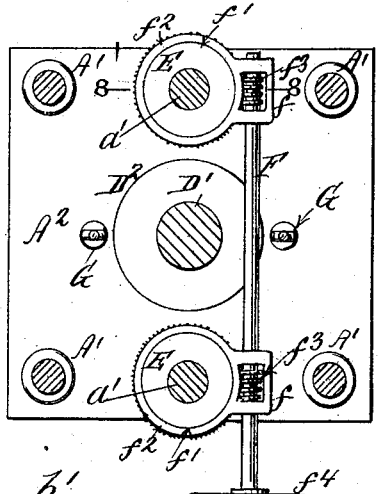
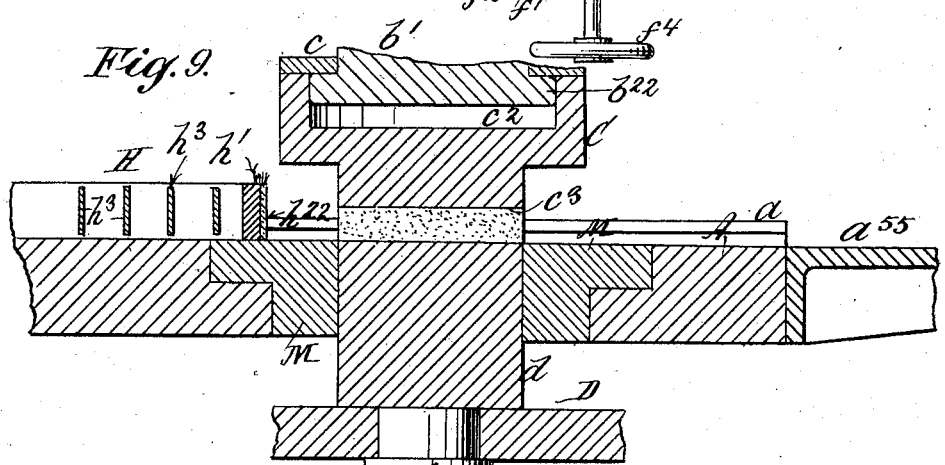
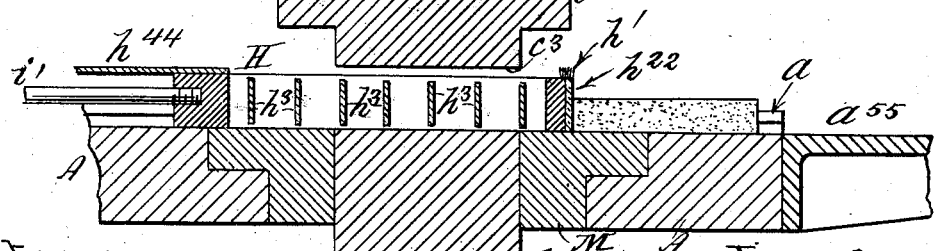
Witnesses:
D.W. Gardner
Inventor:
William B. Updegraff
By his attorney
Geo. W. Miatt
THE NORRIS PETERS CO., WASHINGTON, D. C.

UNITED STATES PATENT OFFICE.

WILLIAM B. UPDEGRAFF, OF NEW YORK, N. Y.

PRESS FOR PLASTIC MATERIALS.

994,349. Specification of Letters Patent. Patented June 6, 1911.

Application filed March 28, 1910. Serial No. 551,904.

*To all whom it may concern:*

Be it known that I, WILLIAM B. UPDEGRAFF, a citizen of the United States, residing in the borough of Manhattan, city, county, and State of New York, have invented certain new and useful Improvements in Presses for Plastic Materials, of which the following is a specification.

My improvements relate to presses for the manufacture of articles from plastic, compressible material, as tiles, bricks, building blocks and other articles to be molded into shape under pressure.

It is well known that under the old method of manufacturing tiles and other articles from plastic material in presses actuated manually it is practically impossible to attain uniform treatment of all molded forms alike, owing to variations in atmospheric conditions, to fluctuations in energy applied, limitations of strength and pressure, lack of control and support of molded forms while being ejected from the molds, resulting in buckling, warping, &c., failure to eliminate air from the material during the molding thereof, causing in wind-blows, laminated structure, and subsequent flaking, and other defects arising from causes inherent in toggle and cam presses.

My invention consists in the combination and arrangement of operative parts and devices hereinafter set forth whereby the above named difficulties and others incidental to the old method of manufacture are avoided by automatic means controlling and applying fluid pressure in such manner that all molded forms receive like treatment and hence are of uniform density, hardness and strength.

Figure 1:
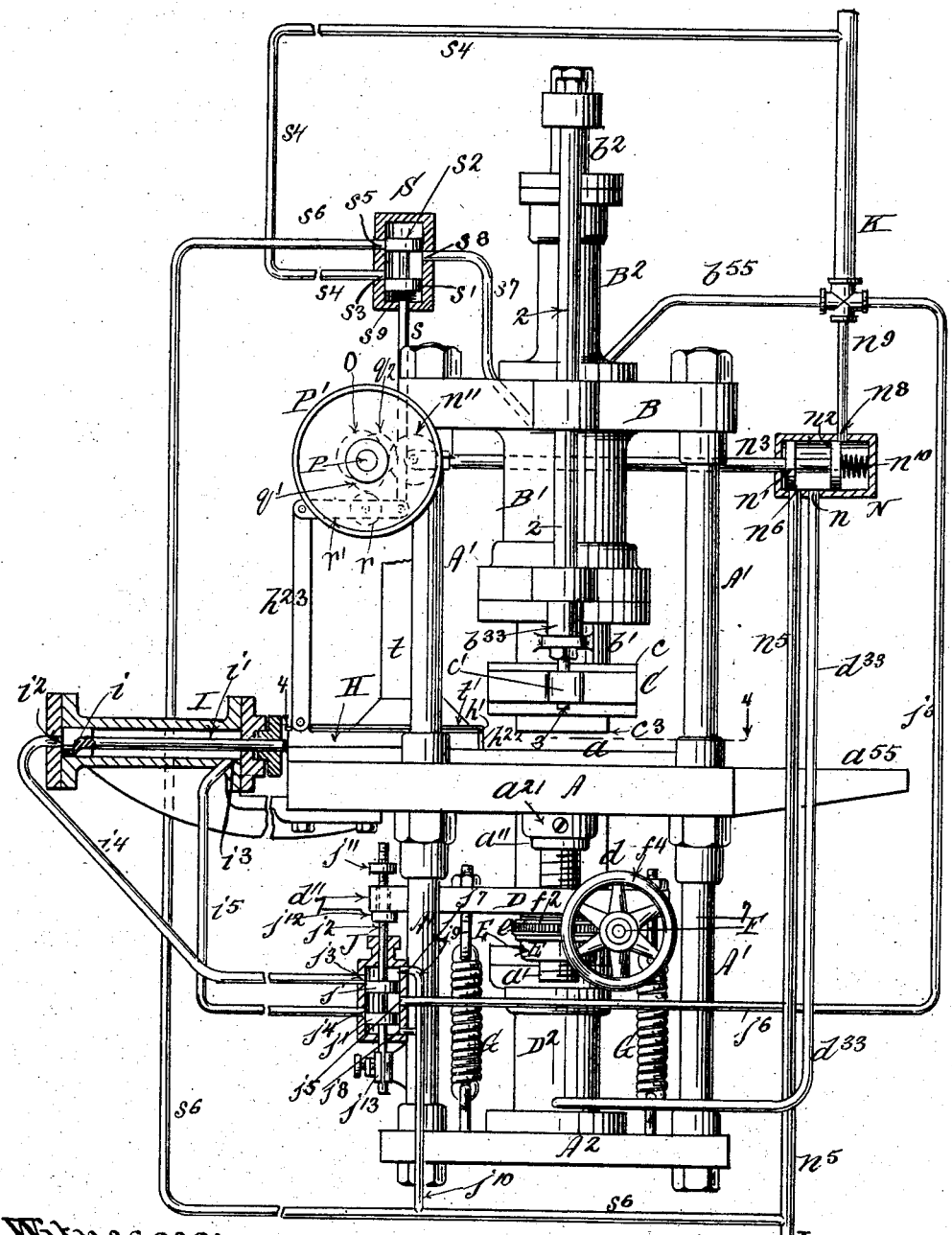
Figure 2:
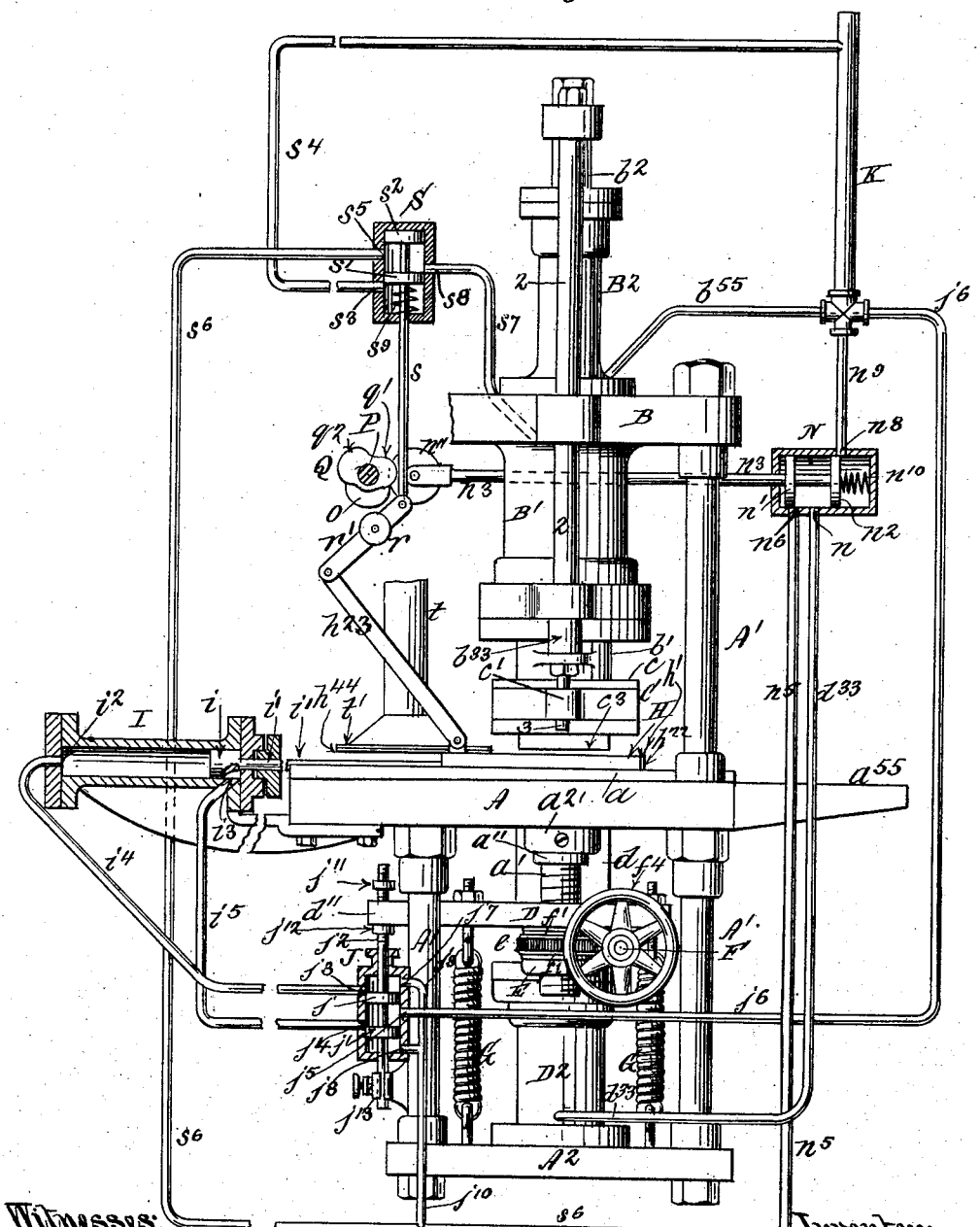
Figure 3:
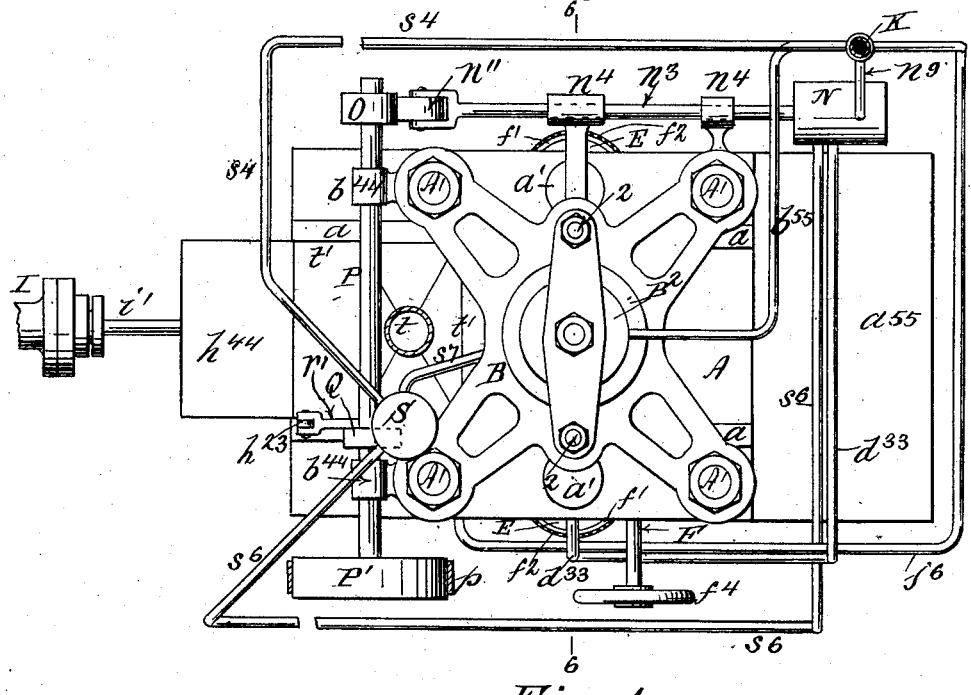
Figure 4:
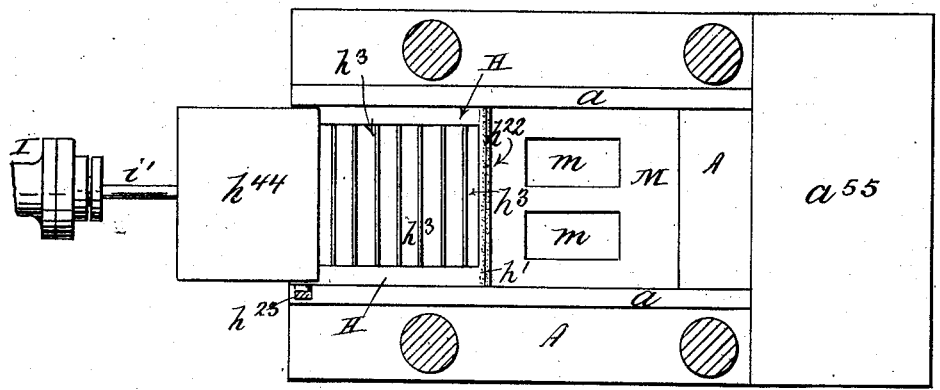
Figure 5:
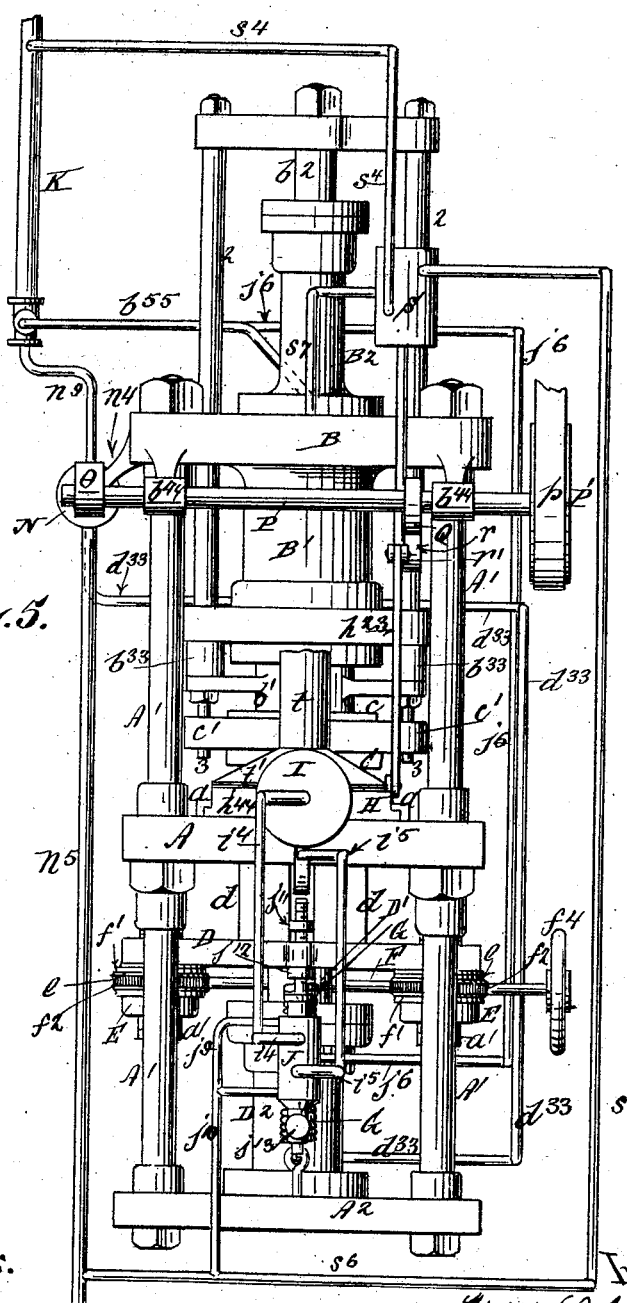
Figure 6:
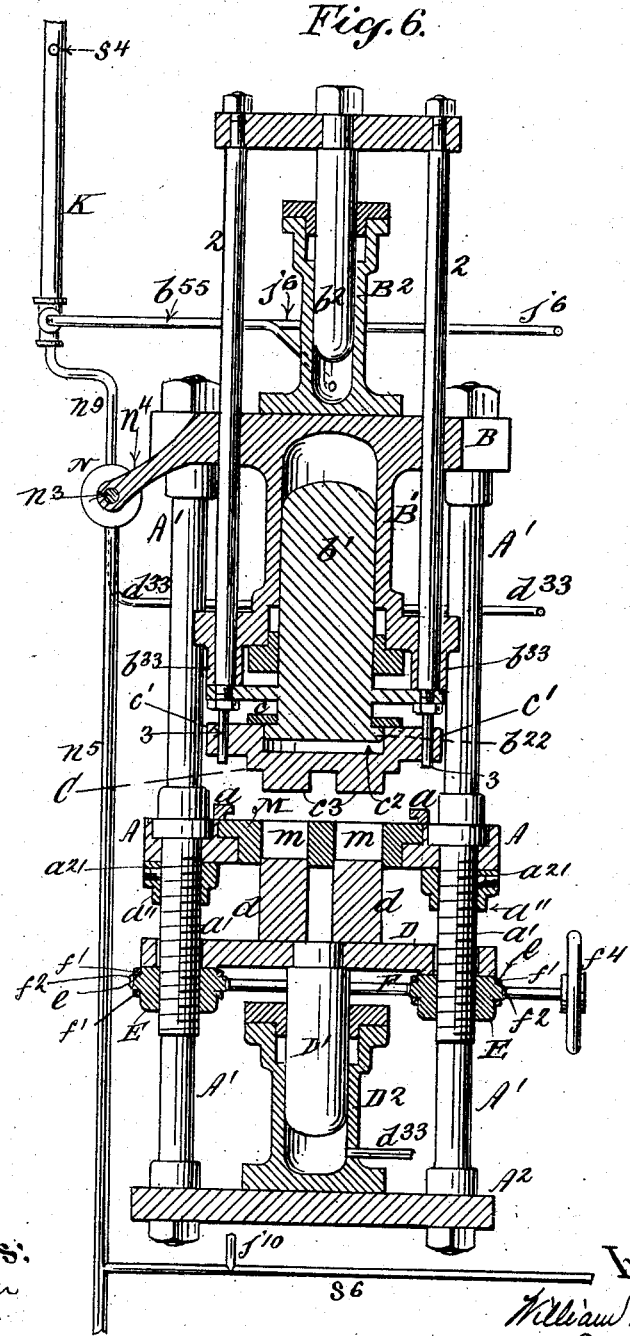

In the accompanying drawings, Figure 1, is a sectional elevation of apparatus adapted to give practical effect to my invention in the manufacture of tiles and similar articles, showing the conveyer box retracted, parts being broken away for economy of space; Fig. 2, is a similar view showing the parts at the termination of the advanced thrust of the conveyer box; Fig. 3, is a plan of the apparatus; Fig. 4, a horizontal section taken upon the plane of the line 4—4— Fig. 1; Fig. 5, is an elevation of the apparatus looking from the left of Fig. 1; Fig. 6, is a vertical sectional elevation upon the plane of the line 6—6— Fig. 3; Fig. 7, a horizontal sectional elevation taken upon the plane of the line 7—7— Fig. 1; Fig. 8, is a sectional elevation upon an enlarged scale taken upon the plane of the line 8—8— Fig. 7; Fig. 9, is a sectional view upon an enlarged scale showing the position of adjacent parts at the moment the mold forms are raised out of the molded block; Fig. 10, is a similar view showing the position of the parts when the conveyer box has reached the end of its forward thrust and the lower dies are about to descend.

A stationary work table A, is supported on standards $A'$, attached to a bed plate $A^2$, resting on a suitable foundation. The standards $A'$, extend above the work table A, the cross head B being rigidly secured to their upper extremities. The cross head B in turn supports the main pressure cylinder $B'$, and the pull back cylinder $B^2$, the latter being of relatively small diameter as is also its plunger $b^2$, as compared with the main plunger $b'$. These two plungers $b'$, $b^2$, are rigidly linked together by tie rods 2, 2.

Mounted so as to be vertically movable upon the lower end of the main plunger $b'$, is the upper die block C. That is to say the means of attachment are such as to admit of a slight degree of vertical play or lost motion between the parts so that the plunger may be slightly raised without disturbing the upper die block C, when the latter is resting on the material in the mold block M, as and for the purpose hereinafter set forth. Various mechanical expedients may be resorted to in mounting the upper die block C on the lower end of the plunger $b'$, so as to afford the requisite degree of vertical play or lost motion between them, and I do not limit myself in this respect to the specific construction shown in the drawings, in which the lower end of the plunger $b'$, is formed with an annular flange $b^{22}$, upon which the upper die block C is mounted by means of an annular cap $c$, and the alinement of the upper die block C is maintained by extensions 3, 3, of the stay rods 2, 2, which extensions pass through guide loops $c'$, $c'$, on the upper die block C. The chamber $c^2$, in which the flange $b^{22}$, of the plunger $b'$, is confined by the cap $c$, is of greater depth than said flange $b^{22}$, so as to leave a margin of space for play between the parts.

The upward thrust of the plungers $b'$, $b^2$, is limited, and the highest position of the upper dies $c^3$, $c^3$, is prescribed by stops $b^{33}$, $b^{33}$, attached to any stationary part, for instance as shown herein on the cross head B, through which the rods 2, 2, pass. The mold block M is mounted on the table A, being countersunk therein, with its upper surface flush with that of the table A. The lower dies $d$, $d$, are mounted upon a cross head D, attached to a plunger D', the lower portion of which rests in what I designate as the extracting cylinder $D^2$, by means of which the plunger D', and cross head D may be raised by fluid pressure to force the compressed plastic material (the molded forms) from the molds $m$, $m$. When in its prescribed lowest position the cross head D, rests upon supporting stops E, E, which are adjustable vertically for the purpose of regulating the depth of the molds (of which the lower dies $d$, $d$, form the bottoms) and hence the capacity of the molds according to requirements of use. I accomplish this in the structure shown in the drawings by making the supporting stops E, E, in the form of nuts engaging with the suspender screws $a'$, $a'$, attached to the table A, and projecting downward vertically from the underside thereof. For the purpose of effecting the simultaneous and uniform adjustment of these supporting stops E, E, upon their suspender screws $a'$, $a'$, I provide a worm shaft F, mounted in bearings $f$, $f$, (see Figs. 7 and 8) which encircle the supporting stop nuts E,—the latter being formed with shoulders $e$, $e$, which sustain the ring straps $f'$, $f'$, and also with encircling worm gear teeth $f^2$, $f^2$, with which the worms $f^3$, on the shaft F, engage. A hand wheel $f^4$, or equivalent, is provided to effect the rotation of the worm shaft F, and the vertical adjustment of the supporting stops E, E, when desired.

The upward thrust of the extracting plunger D', and cross head D, is limited by permanent stops $a''$, $a''$, which insure the alinement of the upper surfaces of the lower dies $d$, $d$, with the plane of the surface of the table A, and prevent their projection above it. These stops may consist of the under side of the nuts $a^{21}$, $a^{21}$, underneath the table which secure the suspender screws $a'$, $a'$, in position. Retractile springs G, G, are arranged in conjunction with the cross head D, in such manner as to tend constantly to force and hold it against the supporting stops E, E, it being understood that other elastic resilient pressure or tension devices may be substituted for the springs G, G, with like result.

The conveyer box H, by which the plastic material is forwarded and delivered to the molds $m$, $m$, travels in ways $a$, $a$, on the face of the table A. For this purpose it may be forwarded and retracted automatically by various well known mechanical expedients, that shown in the drawings consisting of the rod $i'$, of a piston $i$, traveling in what I designate as the conveyer cylinder I, having end ports $i^2$, $i^3$, connected by ducts $i^4$, $i^5$, with the conveyer controlling valve J, by which fluid pressure is shifted alternately from one end of the conveyer cylinder to the other. This conveyer controlling valve J, has two piston disks $j$, $j'$, on the valve stem $j^2$, spaced apart thereon to control the ports $j^3$ and $j^4$, to the ducts $i^4$, $i^5$. Between the piston disks $j$, $j'$, is the inlet port $j^5$, connected by the duct $j^6$, with the main fluid pressure supply conduit K. Discharge ports $j^7$, $j^8$, at the end of the valve casing connect with discharge ducts $j^9$, $j^{10}$. The position of the valve stem $j^2$, is controlled indirectly by the plunger D', of the extracting cylinder $D^2$. Thus a trip arm $d''$, on the cross head D may be arranged to raise and lower the valve stem $j^2$, just prior to the completion of the stroke of the plunger D', in either direction as hereinafter set forth, the exact timing being prescribed by the adjustable collars $j''$, $j^{12}$, on the upper portion of the valve stem $j^2$. When not thus actuated by the extractor plunger D', the valve stem $j^2$, is held stationary by a friction clamp $j^{13}$.

Fluid pressure is supplied to the extractor cylinder $D^2$, through a duct $d^{33}$, which also acts as the relief conduit. This duct $d^{33}$, communicates through the port $n$, with the extractor controlling valve chamber N, containing piston disks $n'$, $n^2$, on a valve rod $n^3$, which is supported by the casing N and by stationary slide bearings $n^4$, on the cross head B or other fixed part. A discharge duct $n^5$, communicates with the discharge port $n^6$, in the casing of the extractor controlling valve N, which latter is also formed with an inlet port $n^8$, by which fluid pressure is admitted to the valve casing N, through the duct $n^9$, communicating with the main fluid pressure conduit K. The arrangement of these ports and piston disks is such that when the inlet port $n^8$, is closed the discharge port $n^6$, will be open, and vice versa,—the port $n$, always being open and in communication with the extractor cylinder through the medium of the duct $d^{33}$.

A spring $n^{10}$, tends constantly to thrust a roller $n''$, mounted on the outer end of the valve rod $n^3$, against a cam O on the constantly rotating power shaft P,—the action of the cam O being to open the inlet port $n^8$, and close the discharge port $n^6$, against the resistance of the spring $n^{10}$, which latter tends constantly to close the inlet port $n^8$, and open the discharge port $n^6$.

Mounted on the constantly rotating power shaft P, is a cam Q, formed with the two lobes $q'$, $q^2$, in the same plane. These lobes $q'$, and $q^2$, under certain conditions, contact with a roller $r$, mounted on a floating lever $r'$, which is pivotally connected at one end to the upper end of a connecting rod $h^{23}$, the lower end of which is pivotally connected to the side of the conveyer box H,—the other end of the floating lever $r'$, being pivotally connected to the valve rod $s$, of the main pressure cylinder valve S. This upper end of the valve rod $s$, carries two piston disks $s'$, $s^2$, so spaced as to alternately open and close the inlet port $s^3$, connected by duct $s^4$ with the main fluid pressure supply conduit K, and the discharge port $s^5$, connected by the duct $s^6$, with the discharge conduit $n^5$. The duct $s^7$, connecting the main pressure cylinder B', with its controlling valve S, opens into the casing of the latter through a central port $s^8$, between the piston disks $s'$, $s^2$. A spring $s^9$, or equivalent mechanical expedient tends constantly to raise the valve stem $s$, to open the outlet port $s^5$, and close the inlet port $s^3$, which it does except when the valve stem $s$, is depressed against the resistance of the spring $s^9$, by the lobes $q'$, $q^2$, of the cam Q, acting through the roller $r$, on the floating lever $r'$, as shown in Fig. 1. Hence when said roller $r$, and floating lever $r'$, are lowered, as in Fig. 2, by the advance of the conveyer box H, to fill the molds, the cam Q will rotate, in case of any hitch or delay elsewhere, without disturbing the main cylinder controlling valve S, the inlet port $s^3$, of which remains closed by reason of the action of the spring $s^9$, until the conveyer box H, is again retracted, thus by means of the connecting rod $h^{23}$, raising the roller $r$, on the floating lever $r'$, again into position for contact with the lobes $q'$, $q^2$, of the cam Q. This obviates any possibility of the descent of the plunger and upper die block until the conveyer box is fully retracted.

It is obvious that the cam Q, can be rendered inactive in so far as the main pressure cylinder controlling valve S, is concerned by various automatic mechanical expedients,—the essential feature in this respect being the use of automatic means whereby the relief of the main pressure cylinder is assured during the forward stroke of the conveyer box H, and the admission of pressure to said main pressure cylinder rendered impossible until the said conveyer box H, is retracted from underneath the upper dies. The power shaft P, may be mounted in bearings $b^{44}$, $b^{44}$, on the cross head B, or otherwise supported as may be found most expedient. Power is transmitted to it by a pulley P', and belt $p$; or by any other means or method desired.

The material to be molded is supplied to the conveyer box H, by a chute $t$, communicating with a hopper or other source of supply. The bottom of the chute $t$, is flanked on all sides by a cover or retaining plate or plates $t'$, $t'$, under which the conveyer box H, is located when in its retracted position. This is for the purpose of confining the material to the conveyer box H. When the latter is advanced to feed the molds, the supply of material is shut off by a gate plate $h^{44}$, secured to and extending beyond the rear of the conveyer box H, a sufficient distance to insure the closing of the lower end of the chute $t$, until the conveyer box H, is again retracted.

The forward edge of the conveyer box H is preferably provided with a swab or brush $h'$, for cleaning and oiling the under surface of the upper dies $c^3$, $c^3$, during the reciprocation of the conveyer box H,—it being understood that the stops $b^{33}$, $b^{33}$, on the lower portion of the cross head B detain the upper dies $c^3$, $c^3$, with their faces just above the upper horizontal plane of the conveyer box H, so that the swab or brush $h'$, protruding slightly above that plane, will contact with the faces of the dies, said dies it will be remembered, being hung upon the lower end of the main plunger B', in such manner that they are free to yield upward slightly if necessary under pressure of the swab or brush as it passes, thereby insuring a close contact of opposed surfaces and a clean sweep of the die faces. In other words the vertical play provided for between the upper die block C, and the main pressure plunger B', is more than sufficient to compensate for any protrusion of the swab or brush above the plane of the under surfaces of said dies when elevated.

The forward edge of the conveyer box H, is also preferably formed with an elastic bumper $h^{22}$, to encounter and forward the tile molded and extracted from the molds preceding the forward movement of the conveyer box H,—such molded forms being advanced finally to the table extension or apron $a^{55}$, or to a forwarding belt or transfer mechanism as may be found most expedient under the circumstances of use.

In order to counteract the rearward pressure of the material within the conveyer box H during the forward thrust thereof, and to keep the material loose and equally distributed therein, I form the conveyer box H, with transverse vanes $h^3$, $h^3$, which practically sub-divide the box into a series of compartments in each of which the weight of material and resistance to movement is relatively small as compared with the mass of material to be forwarded to the molds. Hence the packing and caking of the material during transit is reduced to the minimum, and it is delivered in a comparatively loose condition to the molds, thereby permitting uniform distribution and uniformity of density therein.

The lower portions of the upper cylinder B², is connected by a duct $b^{55}$, permanently with the main conduit K, of fluid pressure, so that the tendency of the plunger $b^2$, is to constantly raise and retract the plunger $b'$, in the main pressure cylinder B', which it does when the fluid pressure in the latter is released, otherwise the greater area of the plunger $b'$, counteracts and overcomes the resistance of the upper plunger $b^2$. In fact the upper plunger $b^2$, and cylinder $B^2$, constitute simply an elastic resilient pull back, or retractile means for raising the main plunger $b'$, when released from pressure, and hence retractile springs or similar mechanical expedients may be substituted for the upper cylinder $B^2$, and plunger $b^2$, with substantially the same results, if desired.

It is to be understood that the term " elastic fluid pressure," is used herein to designate and include any suitable fluid pressure, whether liquid or gaseous. It is also to be understood that while I have herein mentioned and described the molding of tiles in my improved press I do not limit myself to such use, as the essential features of my invention are applicable to presses for the manufacture of blocks, bricks and various articles molded from plastic or compressible material. Neither do I limit myself to the identical details of construction shown since various modifications and mechanical expedients may be resorted to with like results. Furthermore, the term "plastic material" is herein used in a broad sense, as including any compressible, moldable material, wet or dry, powdered or adhesive.

As illustrating the use and operation of my improved press, we will follow the cycle of operations, beginning at the point where the conveyer box H, has been retracted after depositing plastic material in the molds, at which moment the various operative parts (except the valve S) are in the positions shown in Fig. 1, namely, the plungers $b^2$, $b'$, and upper die block C, are fully raised and supported in such position against the stops $b^{33}$, $b^{33}$, by the fluid pressure in the pull back cylinder $B^2$, and the lower dies $d$, $d$, cross head D, and retracting plunger D', are at the prescribed lowest limit of motion, with the cross head D resting upon the supporting stops E, E. Owing to the retracted position of the conveyer box H, the connecting lever $h^{22}$, sustains the floating lever $r'$, with roller $r$, in the path of the lobes of the cam Q. When the lobe $q'$, of the cam Q, encounters and depresses the roller $r$, the floating lever $r'$, depresses the valve rod $s$, against the resistance of the spring $s^9$, thereby opening the inlet port $s^4$, and closing the exhaust port $s^5$, and admitting fluid pressure to the main cylinder B', through the port $s^8$, and duct $s^7$. When the resistance of the upper plunger $b^2$, is overcome, the main plunger $b'$, descends, lowering the upper die block C, to the mold block M, with the dies $c^3$, $c^3$, protruding into the upper ends of the molds $m$, $m$, and resting upon the plastic material in the molds. The continued descent of the plunger $b'$, takes up the slack or lost motion between it and the upper die block C, after which the further descent of the plunger and die block compresses the plastic material against the upper surfaces of the lower dies $d$, $d$, which constitute the bottoms of the molds $m$, $m$. This preliminary compression of the material in the molds tends to solidify the mass and separate the air therefrom and in order to eliminate the air and prevent lamination and the subsequent flaking of the completed tile, the mold forms are released temporarily from the pressure of the main plunger $b'$, by the merging of the lobe $q'$, into the concentric portion of the cam Q, which allows the spring $s^9$, to raise the valve stem $s$, close the inlet port $s^3$, and open the discharge port $s^5$, thereby relieving the pressure in the cylinder B', and allowing the plunger $b^2$, (which is under continuous fluid pressure) to raise the plunger $b'$, slightly, but not sufficient to take up the lost motion provided for by the mounting of the upper die block C, upon the plunger $b'$, as hereinbefore described. Hence the partially compressed mold forms are held down firmly in the molds by the weight of the upper die block, which preserves their shape and prevents warping during the escape of air from the mold forms, owing to their release from fluid pressure in the main cylinder. Almost immediately however the second lobe $q^2$, of the cam Q again depresses the roller $r$, opening the inlet port $s^3$, closing the exhaust port $s^5$, and re-admitting fluid pressure to the main cylinder B', when the final compression of the material in the molds is accomplished.

Just prior to the time the cam lobe $q^2$, leaves the roller $r$, the cam O, acting on the roller $n''$, begins to force back the valve rod $n^3$, causing the valve disks thereon to close the discharge port $n^6$, and open the inlet port $n^8$, thereby admitting fluid pressure to the extractor cylinder $D^2$. Hence since the main cylinder B', has again been relieved of fluid pressure by the shifting of the valve rod $s$, when the lobe $q^2$ leaves the roller $r$ (as above described with relation to the passing of lobe $q'$) allowing the plunger $b^2$, to again predominate, both the main plunger $b'$, and the extractor plunger D', will rise simultaneously. Thus the material in the molds $m$, $m$, is confined and controlled by the upper die block C, until the lost motion between it and the main plunger $b'$, is taken up, when the further ascent of the plunger $b'$, until arrested by the stops $b^{33}$, raises the upper die block C, and the under surfaces of the dies $c^3$, above the table A, sufficiently to admit of the advance of the conveyer box H, at the proper time. The continued advance of the extractor plunger D', causes the dies d, d, to raise the molded forms out of the molds and to the plane of the table A, which happens when the upward thrust of the cross head D carries it into contact with the stops a", a". It is to be noted in this connection that the upper dies $c^3$, $c^3$, rest upon the molded forms until after the latter have been raised to the level of the table surface, and that the weight of the upper die block C, and also the excess of pressure exerted by the extracting plunger D', as compared with that exerted by the pull back plunger $b^2$, is utilized in preserving the shape and integrity of said molded forms during the whole operation of raising them and extracting them from the molds.

Just prior to the limitation of the upward stroke of the extractor plunger D', by reason of the contact of the cross head D, with the stops a", a", the trip arm d", of the cross head D encounters the shoulder $j'''$, on the valve rod $j^2$, causing the latter to shift the valve disks $j$ and $j'$, in such manner that the port $j^4$, is open to the discharge $j^8$, and the port $j^3$, is open to the fluid pressure supply which is thereby admitted to the conveyer cylinder I, at the rear of the piston $i'$. The change of pressure from the front to the rear of the piston $i'$, takes place just prior to the contact of the cross head D with the stops a", a", so that the molded forms are fully extracted from the molds before the conveyer box H has made any material advance. At the next point in the cycle of operation when the conveyer box has become stationary over the molds, the cam O allows the spring $n^{10}$, acting on the valve rod $n^3$, to shut off the fluid supply port $n^8$, in the valve casing N, and open the discharge port $n^6$, thereby relieving the extractor cylinder from fluid pressure and allowing the retractile springs G, G, to draw the plunger D' and cross head D down until the latter again contacts on the rests E, E. During this retractile movement of the plunger D', and cross head D, the plastic material has ample time to drop from the conveyer box H into the molds m, m, prior to the contact of the arm d", of the cross head D, with the collar $j^{12}$, on the valve rod $j^2$, which results in the reversal of the fluid pressure within the cylinder I, and the retraction of the conveyer box H to its original position at the beginning of the cycle. Incidentally the reciprocation of the conveyer box H, by reason of the swab or brush $h'$, carried thereby cleans and oils the under surfaces of the upper dies $c^3$, $c^3$, and so prevents the plastic material sticking thereto. This cycle of operations will be repeated continuously and automatically during the rotation of the power shaft P or until the cams thereon are shifted out of line of contact with the rollers $r$, and $n''$. I thus attain a press for the molding of forms from plastic material which is essentially and practically automatic, in that so long as the plastic material is supplied to the conveyer box H, through the chute $t$, the various operations will be conducted continuously as long as desired, it being only necessary to remove the mold forms forwarded by the advance movement of the conveyer box H, and their removal may even be effected automatically by well known means. Furthermore the apparatus is safeguarded against injury by reason of the automatic retraction of the roller $r$ during the reciprocal movements of the conveyer box H, so that in case of any clogging of the parts or valves, especially of the controlling valve J, the admission of fluid pressure to the main cylinder B', is prevented, and the plunger $b'$, and upper die block C, cannot descend until the obstruction or defect is remedied. This interposition of an "interrupting" device between the feed mechanism and the compression mechanism is an important feature of my invention since it insures safety in the automatic operation of the apparatus to such an extent that little or no supervision or observation is required. In this connection it may be stated that no "interrupter" or safety device is interposed between the extractor controlling valve casing N and the cam O, as no serious harm could result under any circumstances from the tripping of said controller valve, irrespective of the position of the other parts when the main plunger cylinder B', is inoperative as above set forth by reason of the withdrawal of the roller $r$, from the path of the cam Q.

It is well known in the art that atmospheric conditions affect the plastic material and that frequent adjustment of operative parts is necessary to compensate for such changes. In my apparatus this is quickly and conveniently accomplished by means of the adjustable rest nuts and actuating worm so that the depth of the molds may be regulated with accuracy to accord to the condition of the plastic material, of which only prescribed quantities should be used, adapted to be reduced to moldings of uniform density and thickness.

The control and support of the molded forms during their removal from the molds is also an important feature of my invention,—the weight of the upper die block and also the excess of upward pressure, due to differences in size of upper pull back plunger $b^2$, as compared with the lower retracting plunger D', holding the mold forms firmly on the faces of the lower dies, and preventing buckling or warping, during their removal; the weight of the upper die block also acting on the mold forms during the interval between the primary and finishing pressures, when the upper die block is relieved temporarily from pressure by the main plunger to facilitate the escape of air &c.

By the use of my improved automatic apparatus I not only attain perfect molded forms of uniform density, size and strength, but I also materially reduce the cost of manufacturing because one individual can watch and attend to a number of such presses, and the continuous output greatly exceeds that of the slower, intermittent presses turning out inferior and irregular molding.

What I claim as my invention and desire to secure by Letters Patent is,

1. In a press of the character described, the combination with a stationary mold block and supporting table, of an extractor die projecting into the lower portion of a mold in said stationary mold block, an extractor plunger upon which said extractor die is mounted, means for varying and prescribing the retractile thrust of said extractor plunger comprising suspender screws on the under side of the stationary mold table, supporting nuts on said suspender screws and means for simultaneously rotating said supporting nuts, retractile means connected with said extractor plunger tending to seat it against said supporting nuts, an upper die plunger formed with an annular flange on its lower end, an upper die block formed with a recess to receive the flanged end of the upper die plunger said recess being of greater depth than the flange on said plunger, an annular cap attached to the upper side of the die block and overlapping the annular flange on said plunger, means for actuating said upper die plunger and said extractor plunger by fluid pressure, stops prescribing the retractile thrust of said upper die plunger, a retractor for said upper die plunger consisting of an auxiliary plunger inverted with relation thereto and rigidly connected therewith, and means for maintaining said auxiliary retractor plunger under continuous fluid pressure for the purpose described.

2. A press for molding plastic material, comprising a table, a separately formed detachable mold block supported upon and countersunk within said table with its upper surface flush with the upper surface thereof, lower dies projecting into the lower portions of the molds in said mold block, a plunger on which said lower dies are mounted, an upper die plunger, stops prescribing the retractile thrust of said upper die plunger, an elastic resilient tension device which tends constantly to retract said upper plunger consisting of an auxiliary plunger inverted with relation to the upper die plunger and rigidly connected therewith by means of tie rods, said tie rods, a valve controlling the admission and escape of fluid pressure to and from the upper die plunger cylinder, a floating lever pivotally attached to the valve rod and to a connecting rod pivotally attached to the conveyer box, said conveyer box mounted on ways on the table, means for advancing and retracting said conveyer box by fluid pressure, a cam arranged to act on said floating lever when the conveyer box is in its retracted position to depress the valve rod to admit fluid pressure to the upper die plunger cylinder, the connecting rod between conveyer box and floating lever being arranged to remove the latter from the contact with the said cam when the conveyer box is advanced, thereby causing the valve to release the fluid pressure in the upper die plunger cylinder, and means for actuating all said plungers by fluid pressure for the purpose described.

3. A press for molding plastic material, comprising a table, a mold block mounted thereon flush with the surface thereof, lower dies projecting into the lower portion of said mold block, a plunger on which said lower dies are mounted, stops for limiting the upward thrust of said lower dies when the upper surfaces of the latter are flush with the upper surface of the mold block, stop rests limiting the downward thrust of said lower dies, an upper die block, a plunger supporting said upper die block by means which admit of a limited degree of vertical lost motion between the parts, and means for actuating said plungers by fluid pressure, for the purpose described.

4. A press for molding plastic material, comprising a table, a separately formed detachable mold block supported upon and countersunk within said table with its upper surface flush with the upper surface thereof, lower dies projecting into the lower portions of the molds in said mold block, a plunger upon which said lower dies are mounted, means for raising said lower die plunger by fluid pressure, an upper die block, a plunger upon which said upper die block is mounted by means which admit of a limited degree of lost motion between the parts, a smaller auxiliary plunger under constant fluid pressure, inverted with relation to the upper die plunger and rigidly connected therewith by tie rods, said tie rods, inlet and relief valve mechanism controlling the fluid pressure exerted upon the upper die plunger, and a plurality of cam surfaces actuating said inlet and relief valve mechanism whereby the upper die plunger and upper die block are raised and depressed a plurality of times to subject the plastic material within the molds to a plurality of compressions substantially in the manner and for the purpose described.

5. A press for molding plastic material, comprising a table, a separately formed detachable mold block supported upon and countersunk within said table with its upper surface flush with the upper surface thereof, lower dies projecting into the lower portions of the molds in said mold block, a plunger on which said lower dies are mounted, an upper die block mounted on a plunger by means which admit of a limited degree of vertical lost motion between the die block and said plunger, stops prescribing the retractile thrust of said upper die plunger, an elastic resilient tension device which tends constantly to retract said upper die plunger and die block to their highest position, consisting of a smaller auxiliary plunger inverted with relation to said upper die plunger and rigidly connected therewith by tie rods, said tie rods, a conveyer box mounted on ways on said table, means controlled by the lower die plunger for both advancing and retracting said conveyer box by fluid pressure, a brush on the forward part of the conveyer box arranged to contact with the under surfaces of the upper dies on the yieldable upper die block whereby the weight of the latter is available in attaining close contact with the brush, and means for actuating all the plungers by fluid pressure substantially in the manner and for the purpose described.

WILLIAM B. UPDEGRAFF.

Witnesses:
GEO. WM. MIATT,
D. W. GARDNER.

---

Copies of this patent may be obtained for five cents each, by addressing the "Commissioner of Patents, Washington, D. C."